(12) United States Patent
Wong et al.

(10) Patent No.: US 11,902,880 B2
(45) Date of Patent: *Feb. 13, 2024

(54) INFRASTRUCTURE EQUIPMENT, COMMUNICATIONS DEVICE AND METHODS

(71) Applicant: Sony Group Corporation, Tokyo (JP)

(72) Inventors: Shin Horng Wong, Basingstoke (GB); Martin Warwick Beale, Basingstoke (GB); Brian Alexander Martin, Basingstoke (GB); Vivek Sharma, Basingstoke (GB)

(73) Assignee: SONY GROUP CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/843,472

(22) Filed: Jun. 17, 2022

(65) Prior Publication Data

US 2022/0322208 A1 Oct. 6, 2022

Related U.S. Application Data

(63) Continuation of application No. 17/101,916, filed on Nov. 23, 2020, now Pat. No. 11,368,899, which is a
(Continued)

(30) Foreign Application Priority Data

Sep. 30, 2016 (EP) .................................... 16191990

(51) Int. Cl.
*H04W 48/10* (2009.01)
*H04W 4/70* (2018.01)
(Continued)

(52) U.S. Cl.
CPC ............. *H04W 48/10* (2013.01); *H04W 4/06* (2013.01); *H04W 4/70* (2018.02);
(Continued)

(58) Field of Classification Search
CPC ....... H04W 48/10; H04W 4/70; H04W 76/40; H04W 4/06; H04W 52/0216;
(Continued)

(56) References Cited

U.S. PATENT DOCUMENTS 8,644,826 B2 * 2/2014 Futaki ................... H04W 72/30
455/435.2
10,841,117 B2 * 11/2020 Seo ........................ H04L 1/1671
(Continued)

FOREIGN PATENT DOCUMENTS

EP 2194743 A2 6/2010
EP 2194743 A3 7/2011
(Continued)

OTHER PUBLICATIONS

Gimenez, Jordi Joan, et al. "5G new radio for terrestrial broadcast: A forward-looking approach for NR-MBMS." IEEE Transactions on Broadcasting 65.2 (2019): 356-368. (Year: 2019).*
(Continued)

*Primary Examiner* — Sharad Rampuria
(74) *Attorney, Agent, or Firm* — XSENSUS LLP

(57) ABSTRACT

An infrastructure equipment (eNodeB) is configured to transmit a paging notification which indicates that configuration information which is broadcast in a cell to all communications devices which are configured to operate in accordance with a network controlled function has changed. Communications devices which are configured to perform the network controlled function are provided with an indication that they should receive the configuration information which is broadcast in order to reconfigure the network (Continued)

controlled function. A communications device which is not configured to perform the network controlled function may not recognise the paging notification or at least may detect that it does not need to receive the updated configuration information for the network controlled service. Such communications devices may therefore remain in an idle mode thereby saving power.

20 Claims, 9 Drawing Sheets

Related U.S. Application Data continuation of application No. 16/334,762, filed as application No. PCT/EP2017/073483 on Sep. 18, 2017, now Pat. No. 10,849,051.

(51) Int. Cl.
| | |
|---|---|
| H04W 76/40 | (2018.01) |
| H04W 4/06 | (2009.01) |
| H04W 52/02 | (2009.01) |
| H04W 92/10 | (2009.01) |

(52) U.S. Cl.
CPC ... *H04W 52/0216* (2013.01); *H04W 52/0219* (2013.01); *H04W 76/40* (2018.02); *H04W 92/10* (2013.01)

(58) Field of Classification Search
CPC ............ H04W 52/0219; H04W 92/10; H04W 68/005; H04W 48/16; H04W 8/24; H04W 84/06; Y02D 70/1262; Y02D 70/24; Y02D 70/1242; Y02D 70/25; Y02D 70/142; Y02D 70/21; Y02D 70/26; Y02D 70/00; Y02D 70/126; Y02D 70/10; Y02D 70/12; H04B 7/18528; H04B 7/18571; H04B 7/18576

See application file for complete search history.

(56) References Cited

U.S. PATENT DOCUMENTS

| | | | |
|---|---|---|---|
| 2010/0255859 | A1 | 10/2010 | Park et al. |
| 2011/0103288 | A1 | 5/2011 | Lee et al. |
| 2016/0150590 | A1 | 5/2016 | Pocha et al. |
| 2019/0104499 | A1 | 4/2019 | Trank et al. |
| 2019/0223197 | A1* | 7/2019 | Shin ............... H04L 1/0031 |
| 2019/0246254 | A1* | 8/2019 | Chatterjee ............ H04W 76/11 |
| 2021/0037347 | A1* | 2/2021 | Kim ............... H04W 76/27 |

FOREIGN PATENT DOCUMENTS

| | | |
|---|---|---|
| WO | 2016/120056 A1 | 8/2016 |
| WO | 2016/122193 A1 | 8/2016 |
| WO | 2017/076544 A1 | 5/2017 |
| WO | 2017/076624 A1 | 5/2017 |
| WO | 2017/76624 A1 | 5/2017 |

OTHER PUBLICATIONS

Richter, Lucca, Mark Hoyer, and Stefan Ilsen. "A software defined radio based FeMBMS measurement receiver: Test results." 2019 IEEE International Symposium on Broadband Multimedia Systems and Broadcasting (BMSB). IEEE, 2019. (Year: 2019).*
Capozzi, Francesco, et al. "Downlink packet scheduling in LTE cellular networks: Key design issues and a survey." IEEE communications surveys & tutorials 15.2 (2012): 678-700. (Year: 2012).
International Search Report dated Mar. 5, 2018 PCT/EP2017/073483, filed on Sep. 18, 2017, 25 pages.
3GPP, "Technical Specification Group Radio Access Network; Evolved Universal Terrestrial Radio Access (E-UTRA); Radio Resource Control (RRC);Protocol specification", Release 13, 3GPP TS 36.331, Year: 2016, 623 Pages.
Ericsson, "New WI proposal on Further Enhanced MTC", 3GPP TSG RAN Meeting No. 72 RP-161321 Revision of RP-161319, Busan, Korea, Jun. 13-16, 2016, 7 Pages.
Vodafone et al., "New work item proposal: Enhancements of NB-Iot", 3GPP TSG RAN Meeting No. 72 RP-161324, Busan, Korea, Jun. 13-16, 2016, 8 Pages.
Holma et al., "LTE for UMTS OFDMA and SC-FDMA Based Radio Access", Wiley 2009, System Architecture Based on 3GPP SAE, 11 pages.
Texas Instruments et al., "Explicit DTX Signaling with ACK/NAK Bundling in TDD", 3GPP TSG RAN WG1 No. 52bis R1-081373, Shenzhen, China, Mar. 31-Apr. 4, 2008, pp. 1-4.
Sony., "Higher data rate for feMTC", 3GPP TSG RAN WG1 Meeting No. 86 R1-166660, Gothenburg, Sweden Aug. 22-26, 2016, 5 Pages.
NTT DOCOMO, "Views on techniques to improve the data rate for Rel-14 MTC", 3GPP TSG RAN WG1 Meeting No. 86 R1-167352, Gothenburg, Sweden Aug. 22-26, 2016, pp. 1-4.
LTE, "LTE in Wireless", Paging in LTE, Nov. 2012, 4 pages.
Qualcom Europe, "Granularity of information at SIB modification", 3GPP TSG-RAN WG2 No. 63bis R2-085587, Prague, Czech Republic, Sep. 29-Oct. 3, 2008, 23 Pages.
LG Electronics Inc., "Discussion on BCCH Update", 3GPP TSG-RAN WG2 No. 59bis R2-074247, Shanghai, China, Oct. 8-12, 2007, pp. 1-2.
Ericsson, "SI update for NB-Iot", 3GPP TSG RAN WG2 No. 93 R2-161637, Malta, Feb. 15-19, 2016, pp. 1-5.
Nokia et al., "SC-PTM for feMTC General Considerations", 3GPP TSG RAN WG1 Meeting No. 86 R1-166605, Gothenburg, Sweden, Aug. 22-26, 2016, 4 Pages.
Huawei, "Summary of email discussion[95bis No. 29][LTE/NB-IOTenh/feMTC] SC-PTM(Huawei)", 3GPP TSG-RAN WG2 No. 96 R1-167815, Reno, Nevada, USA, Nov. 14-19, 2016, pp. 1-16.
Sony, "Multicast support for feMTC", 3GPP TSG-RAN WG2 Meeting No. 95bis R2-166748, Kaohsiung, Taiwan, Oct. 10-14, 2016, 4 Pages.

* cited by examiner

INFRASTRUCTURE EQUIPMENT, COMMUNICATIONS DEVICE AND METHODS

CROSS-REFERENCE TO RELATED APPLICATIONS

The present application is continuation of U.S. application Ser. No. 17/101,916 filed Nov. 23, 2020 which is a continuation of U.S. application Ser. No. 16/334,762 filed Mar. 20, 2019, which is based on PCT filing PCT/EP2017/073483, filed Sep. 18, 2017 which claims priority to EP 16191990.7 filed Sep. 30, 2016, the entire contents of which are incorporated herein by reference.

TECHNICAL FIELD OF THE DISCLOSURE

The present disclosure relates to communications devices configured to transmit data to and receive data from a wireless communications network and to perform a function which is controlled by the wireless communications network. In some embodiments the wireless access interface is configured to transmit configuration information for configuring the function performed by the communications device. The present invention also relates to methods of communicating using communications devices, wireless communications network, infrastructure equipment and methods.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation partnership project (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication (MTC) devices, enhanced MTC (eMTC) devices, wearable devices, devices which require little or no mobility, high resolution video displays and virtual reality headsets.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging. A similar class of devices is the Further Enhanced MTC (fe-MTC) [6]. Current areas of development are aimed at improving the operation of these types of low cost devices so that they are power efficient and can operate in extended coverage, such as inside basements [6][7]. One of the desires is to provide arrangements and techniques in which a power consumed by these devices can be reduced and their reduced capability can be managed.

SUMMARY OF THE DISCLOSURE

Embodiments of the present technique can provide an arrangement in which an infrastructure equipment (eNodeB) is configured to transmit a paging notification which indicates that configuration information which is broadcast in a cell to all communications devices which are configured to operate in accordance with a network controlled function has changed. Communications devices which are configured to perform the network controlled function are provided with an indication that they should receive the configuration information which is broadcast in order to reconfigure the network controlled function. A communications device which is not configured to perform the network controlled function may not recognise the paging notification or at least may detect that it does not need to receive the updated configuration information for the network controlled service. Such communications devices may therefore remain in an idle mode thereby saving power. An example of a network controlled service is a multicast communications service in which an infrastructure equipment may transmit multicast data for reception by any communications device. One example of such a multicast communications function is a single cell-point to multipoint (SC-PTM) function. An example of broadcast configuration information is system information transmitted in system information blocks of an LTE standard, which is specific to a particular function.

Embodiments of the present technique can also provide an arrangement in which a communications device which is configured to perform or about to perform a function is configured to respond to a paging message to establish a connection for receiving downlink data from an infrastructure equipment to transmit an indication of the function being performed. The infrastructure equipment is configured to determine, in accordance with a predetermined condition, whether the communications device should continue to establish the connection for receiving the downlink data from the communications device, and in accordance with the predetermined condition to transmit an indication to the communications device either to abandon the connection for transmitting the data to the communications device or to establish the connection and to transmit the downlink data. In one example the communications device may be receiving or is about to receive multicast data transmitted as a multicast communication function such as SC-PTM. If the communications device receives a paging message from the infrastructure equipment as part of a procedure to establish a connection for transmitting downlink data to the communications device, the communications device may not be capable of receiving the downlink data and the unicast data contemporaneously or at least not on different carriers or narrowband carriers. By receiving an indication that the communications device is currently receiving the unicast data, the infrastructure equipment can determine whether to continue to establish the connection for transmitting the downlink data or to abort the connection establishment. In other examples the infrastructure equipment may direct the communications device to modify the reception of the downlink data so that the unicast data and the downlink data can be received on the same carrier or narrowband carrier. By receiving an indication of the function being performed by the communications device, of which the infrastructure equipment may be unaware because the communications device is performing the function in idle mode, the infrastructure equipment can prioritise whether the communications device should receive the downlink data or the unicast data.

Various further aspects and embodiments of the disclosure are provided in the appended claims, including but not limited to, a communications device, infrastructure equipment, mobile communications system and a method of communicating.

BRIEF DESCRIPTION OF DRAWINGS

Embodiments of the present disclosure will now be described by way of example only with reference to the accompanying drawings in which like parts are provided with corresponding reference numerals and in which.

DESCRIPTION OF EXAMPLE EMBODIMENTS

Conventional LTE Network

Figure 1:
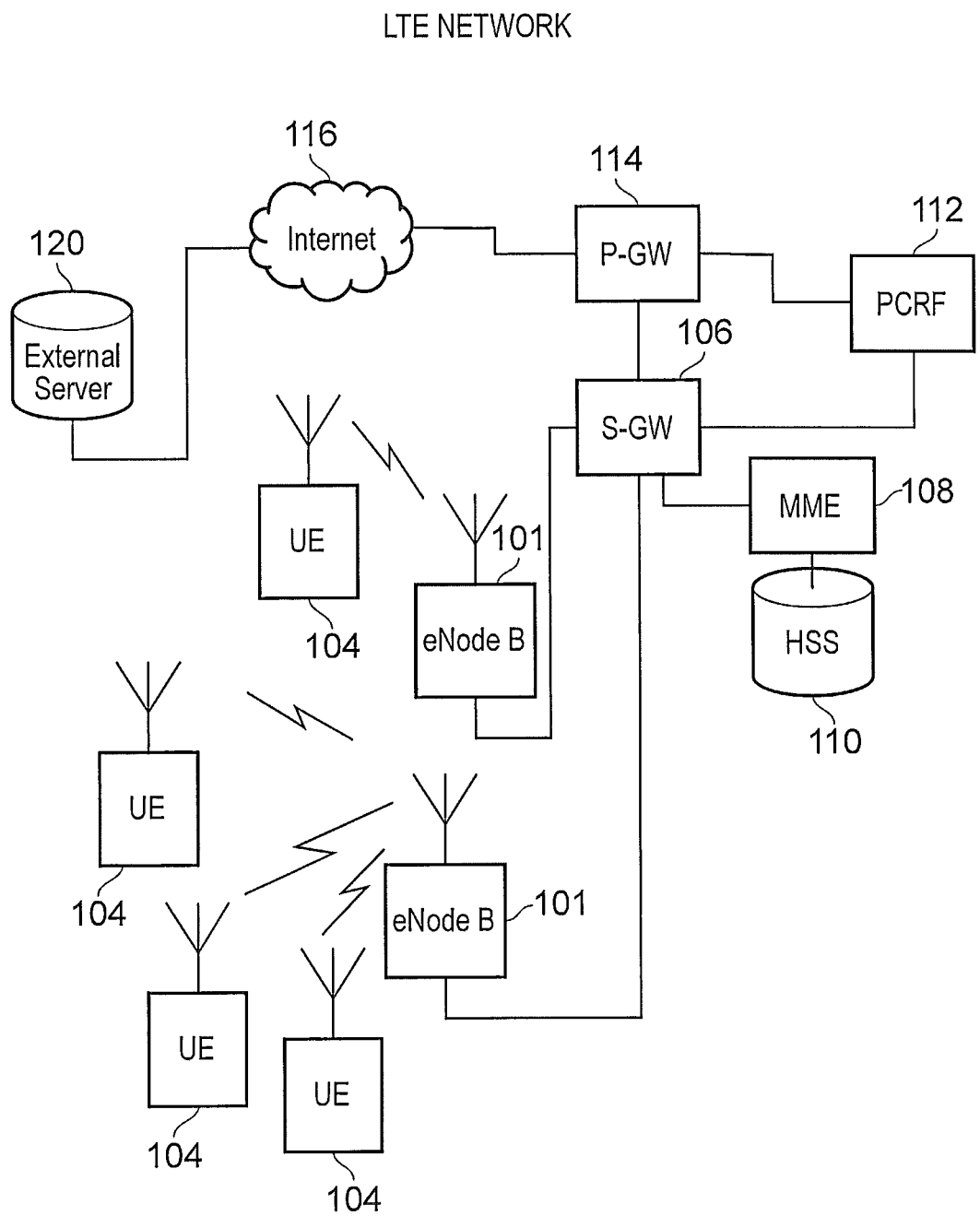
FIG. 1 provides a schematic diagram illustrating an example of a conventional mobile communications system.

FIG. 1 provides a schematic diagram illustrating some basic functionality of a mobile telecommunications network/system operating in accordance with LTE principles. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The mobile telecommunications system, where the system shown in FIG. 1 includes infrastructure equipment including base stations 101. The infrastructure equipment 101 may also be referred to as a base station, network element, enhanced NodeB (eNodeB (eNB)) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface. The core network 102 may also provide functionality including authentication, mobility management, charging and so on for the communications devices served by the network entity.

The mobile communications devices 104 of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links.

As shown in FIG. 1 eNodeB's 101 are connected to a serving gateway S-GW 106 which is arranged to perform routing and management of mobile communications services to the communications devices 104 as they roam throughout the mobile radio network. In order to maintain mobility management and connectivity, a mobility management entity (MME) 108 manages the enhanced packet service (EPS) connections with the communications devices 104 using subscriber information stored in a home subscriber server (HSS) 110. Other core network components include the policy charging and resource function (PCRF) 112 a packet data gateway (P-GW) 114 which connects to an internet network 116 and finally to an external server 120. More information may be gathered for the LTE architecture from the book entitled "LTE for UMTS OFDN and SC-FDMA based radio access", Holma H. and Toskala A. page 25 ff.

LTE Wireless Access Interface

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 2 and 3.

Figure 2:
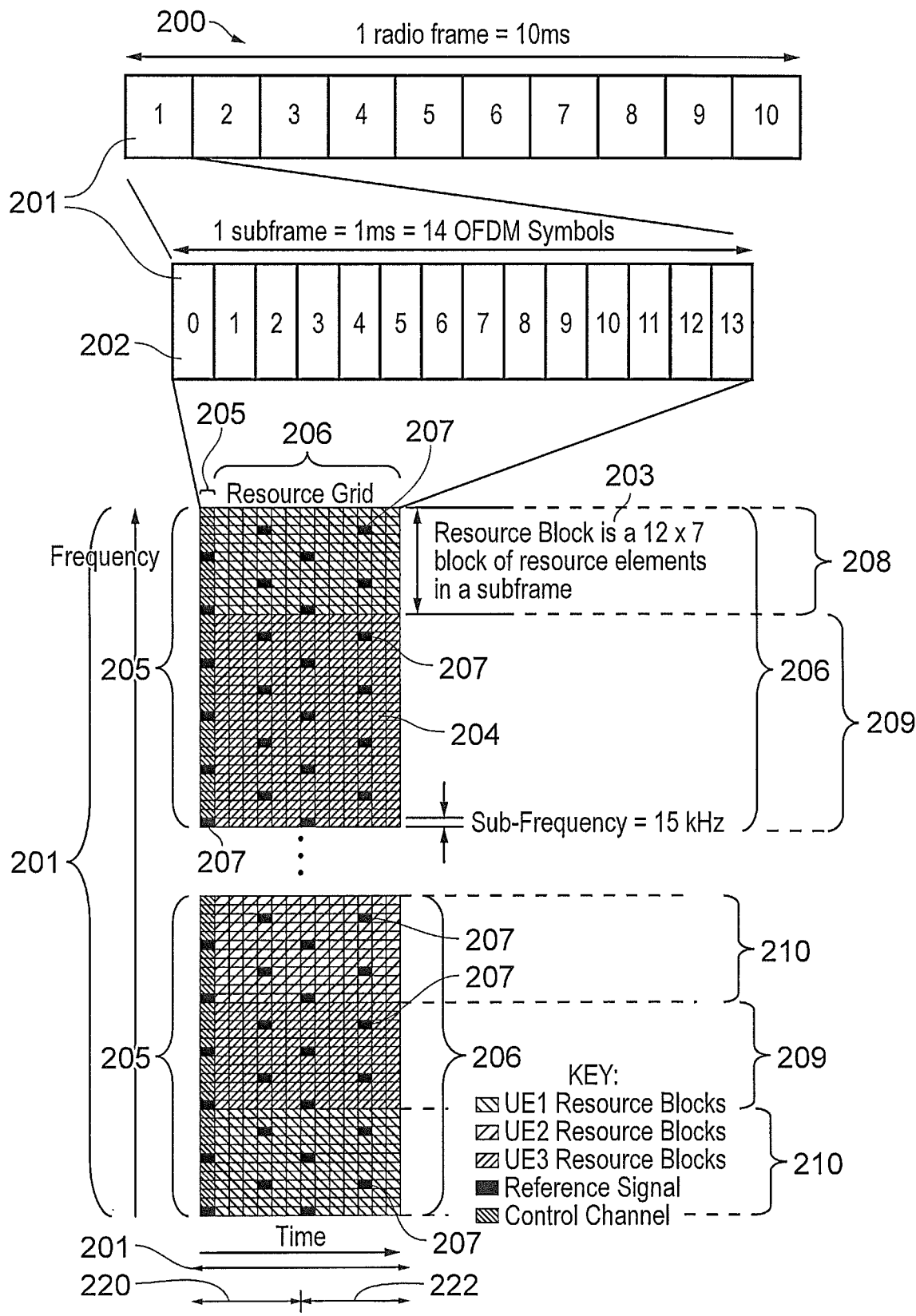
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used for features such as the cyclic prefix of the OFDM symbols). The number of subcarriers varies between 72 subcarriers (1.4 MHz) and 1200 subcarriers (20 MHz). In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz.

As shown in FIG. 2, the resources of the wireless access interface are also temporally divided into frames where a frame 200 lasts 10 ms and is subdivided into 10 sub-frames 201 each within a duration of 1 ms. Each sub-frame 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. The resource elements distributed in time within a sub-frame and frequency across the host system band width represent the communications resources of the host system.

The simplified structure of the downlink of an LTE wireless access interface presented in FIG. 2, also includes an illustration of each sub-frame 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure ePDCCH and PDSCH are most relevant. Further information on the structure and functioning of the physical channels of LTE systems can be found in [1].

Figure 3:
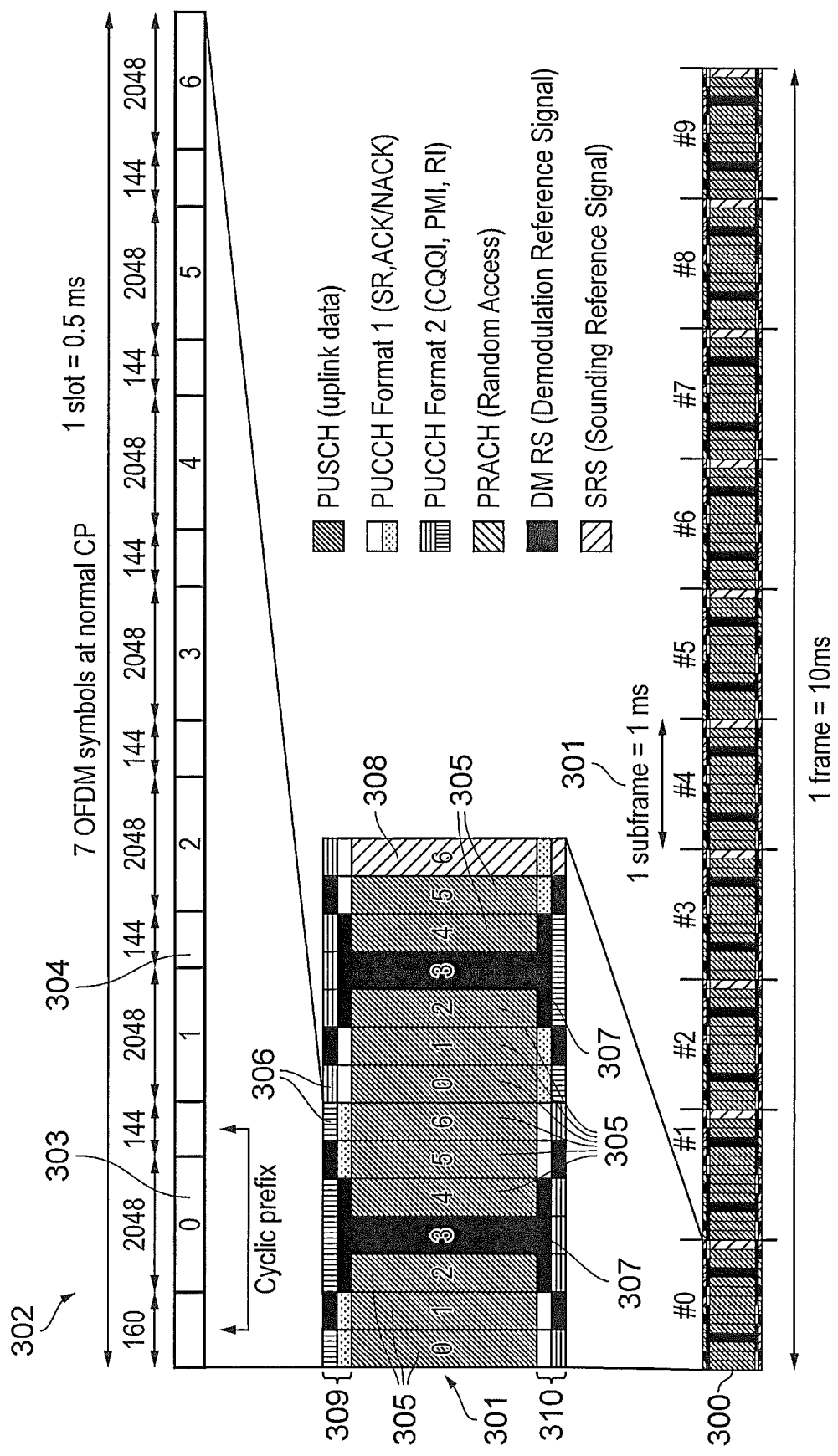
FIG. 3 provides a schematic diagram of an uplink of a wireless access interface of a mobile communications system operating according to an LTE standard.

Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 3, UE1 has been allocated resources 208 of the data region 206, UE2 resources 209 and UE3 resources 210. UEs in an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

Figure 4:
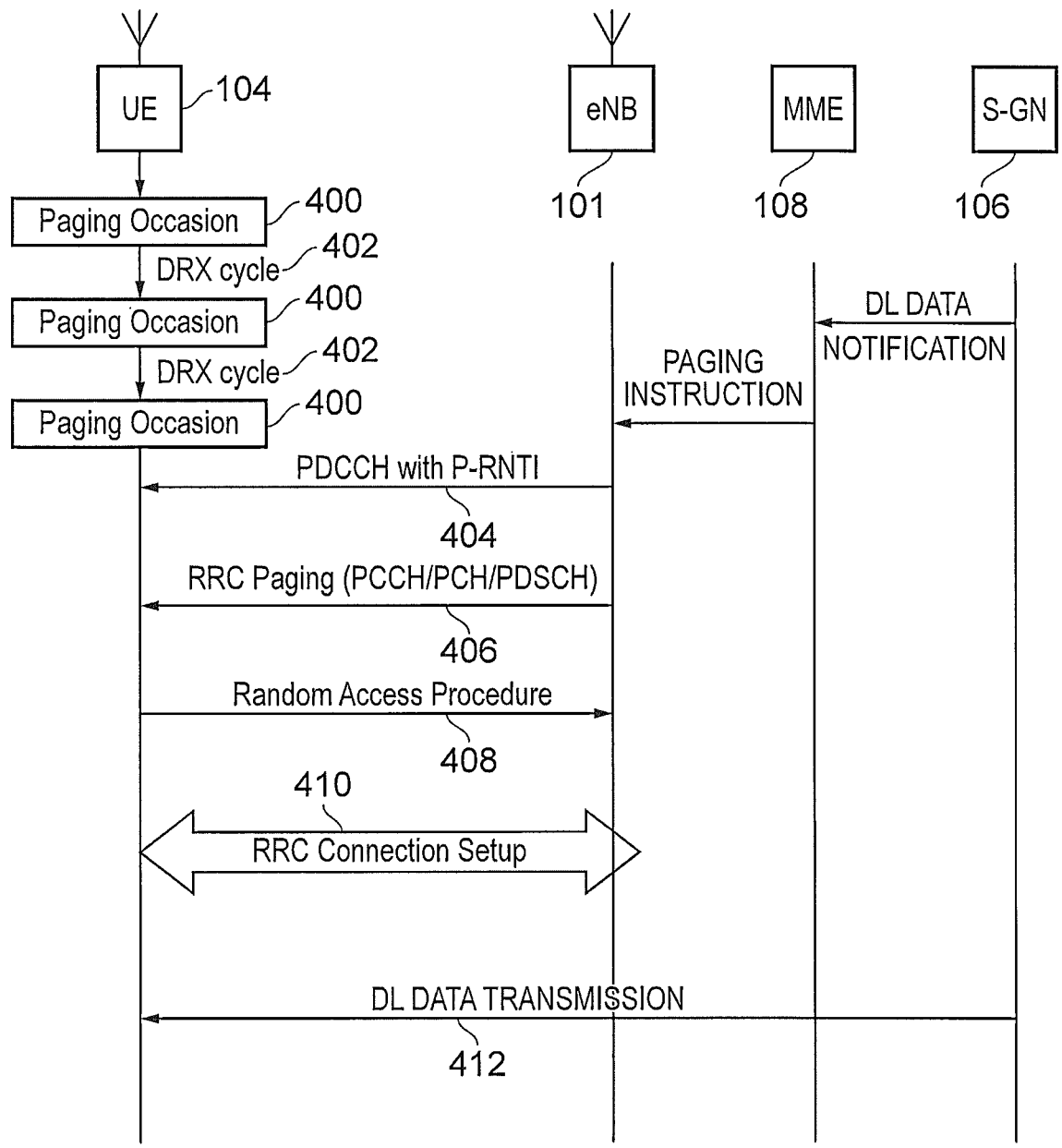
FIG. 4 provides a message sequence diagram and part schematic diagram providing a simplified representation of a paging procedure for a conventional system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 4 illustrates such an uplink frame in an FDD implementation. A frame 300 is divided in to 10 sub-frames 301 of 1 ms duration where each sub-frame 301 comprises two slots 302 of 0.5 ms duration. Each slot is then formed from seven OFDM symbols 303 where a cyclic prefix 304 is inserted between each symbol in a manner equivalent to that in downlink sub-frames. More details of the LTE up-link represented in FIG. 3 are provided in Annex 1.

Conventional Downlink Data Transmission

In order to provide a better appreciation of the embodiments described in the following paragraphs a conventional downlink transmission of data after a paging process will be briefly described. To transmit data to a communications device (UE), it is necessary to locate a UE within a wireless communications network and to establish a connection with the UE for transmitting the data to the UE.

A process for establishing a connection with a UE includes a paging procedure, which informs the UE that the network has data to transmit to it so that the UE should enter an active state and establish a connection. To this end, a paging message is transmitted to the UE as part of the paging procedure. A summary of the paging procedure for LTE can be found in [2].

FIG. 4 provides a simplified representation of a paging procedure according to that which is currently proposed within LTE. As shown in FIG. 4 paging occurs when data is to be transmitted to a UE 104 on the downlink. The data is received at the network and forwarded to the serving gateway 106. The serving gateway 106 then sends a downlink data notification that it has downlink data to send to a UE to the MME 108. As explained above the MME 108 is responsible for mobility management for the UEs and therefore is aware of a current location of each UE within an area comprising a plurality of eNodeBs. The MME 108 then sends a paging instruction to a group of eNodeBs in the area in which the UE is located, including the eNodeB 101 to which the UE 104 is currently attached. The eNodeB 101 then proceeds to transmit a paging message to the UE.

As those acquainted with LTE will appreciate the LTE standard provides a technique in which UEs can perform discontinuous reception (DRX) in order to save battery power. Discontinuous reception allows the UE to reduce power to its receiver because according to the system specification a paging message will not be sent to a UE for a predetermined time. However, according to the specification the UEs are configured to "wakeup" and power up its receiver at each paging occasion in order to receive a paging message which maybe transmitted to the UE from an eNodeB. The time at which a UE wakes up and powers up its receiver to receive a paging message from the eNodeB is referred to as a "paging occasion". Thus as shown in FIG. 4 the UE 104 periodically powers up its receiver at the predetermined paging occasions 400. As also shown in between, the UE powers down its receiver according to its DRX cycle 402. Likewise the eNodeB will only transmit a paging message for that UE in the paging occasions 400 for that UE.

As shown in FIG. 4 when a paging occasion occurs for the UE, the eNodeB 101 transmits in the PDCCH for the UE a paging identifier known as a paging-radio network temporary identifier (P-RNTI). The UE receives the P-RNTI from the PDCCH which also provides an indication of the communications resources of, for example, the shared channel (PCCH/PCH/PDSCH) in which the paging message will be transmitted. Therefore at step 406 the eNodeB 101 transmits an RRC paging message within the communications resources of the PDSCH, which have been indicated by the PDCCH in message 404. If the UE 104 detects an identifier of that UE which is received within the paging message transmitted on the shared communications resources (PDSCH) 406, then the UE 104 performs a random access procedure 408 in order to request downlink communications resources from the eNodeB 101. There then follows an RRC connection setup exchange of messages 410 which establishes an RRC connection with the UE 104 so that the downlink data can be transmitted to the UE in communications represented by an arrow 412.

Transmission of Configuration Information

Wireless communications networks can be provided with a facility for broadcasting configuration information to UEs for the UEs to perform network controlled functions. Those acquainted with LTE will appreciate that such configuration information is referred to as system information or other broadcast configuration messages such as SC-MCCH. The system information is transmitted to UEs from a serving eNodeB. System information is transmitted to UEs to provide the UEs with a configuration to perform various functions to transmit and receive data from within a cell formed by the eNodeB. The system information includes a master information block (MIB) and a number of system information blocks (SIB). The MIB is broadcast on a physical broadcast channel (PBCH) of the wireless access interface while the SIBs are transmitted on the PDSCH through radio resource control (RRC) messages. Conventionally the transmission of the SIB in the PDSCH is signalled to the UE by transmitting a control message in the PDCCH (control channel). The MIB is the first thing which the UE detects and allows the UE to achieve downlink synchronisation. The MIB carries the most essential information that is needed for the UE to acquire other information from the cell and includes for example a downlink channel bandwidth, a system frame number and the eNodeB's transmit antenna configuration. The first SIB1 carries information related to the cell in which the UE is operated in order for the UE to access the cell and defines the schedules for the other SIB's. There are various other SIBs which are specified within LTE standards.

Figure 5:
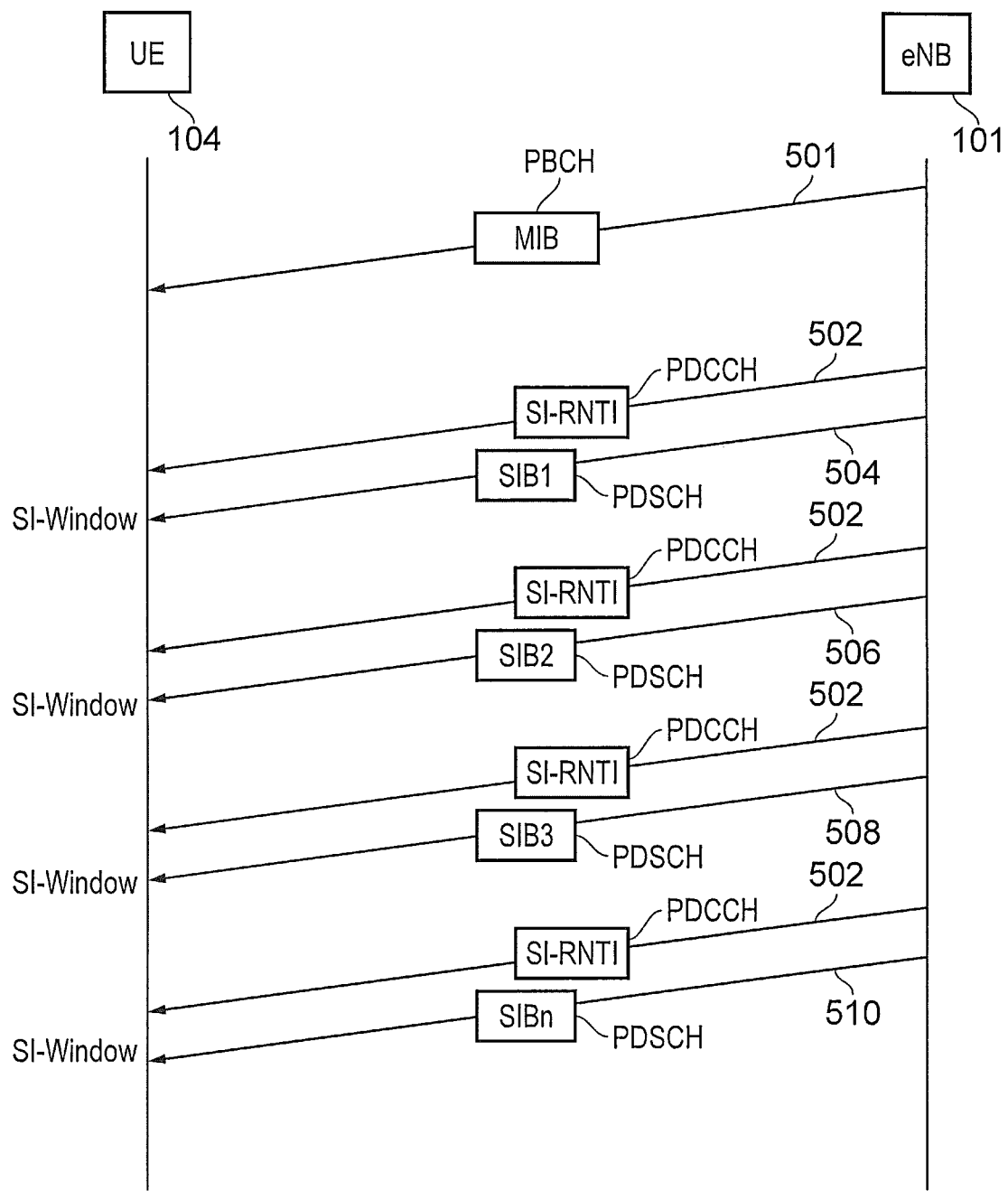
FIG. 5 provides a message sequence diagram illustrating a transmission of system information blocks (SIBs) providing configuration information to communications device.

An illustration of the communication of the SIBs to a UE is shown in FIG. 5. In FIG. 5 a message flow diagram is shown between an eNodeB 101 and a UE 104. As can be seen the first system information is transmitted in the MIB which is transmitted in the PBCH represented by an arrow 501. The UE then detects an SI-radio network temporary identifier (RNTI) transmitted in the PDCCH 502 which communicates corresponding scheduling of the other SIBs. The scheduling of the transmission of the SIBs is within system information windows (SI windows) which occur periodically so that the SIBs are each transmitted in accordance with a predetermined time interval so that the UEs can detect the system information transmitted in each of the SIBs. As shown in FIG. 5 each of the SIB 1, SIB 2, SIB 3 and generically SIBn are transmitted in the PDSCH as represented by arrows 504, 506, 508, 5010. The SIBs are each transmitted within an SI window 512 in accordance with a schedule signalled by the SI-RNTI transmitted in the PDCCH 502. As shown in FIG. 5 a PDCCH transmission 502 is shown in FIG. 5 for receiving the SIB1 504, and it will be appreciated that according to a conventional arrangement a PDCCH transmission, which includes the SI-RNTI would be made in order to receive each of the SIBs 504, 506, 508, 510.

Figure 6:
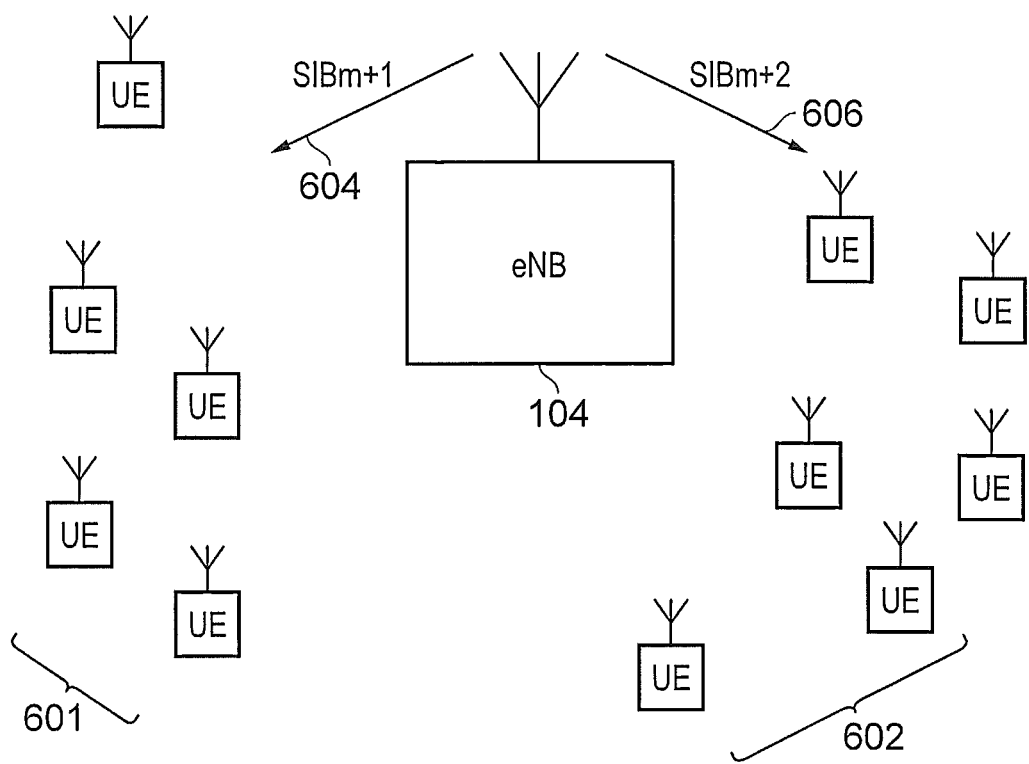
FIG. 6 is a schematic representation illustrating different groups of communications device which are differently configured.

As illustrated in FIG. 6 the eNodeB 104 may serve different groups of UE's 601, 602 which each may be configured in accordance with a different function or arranged to provide a different service to a user. Indeed a first group of the UEs 601 may be configured to operate in accordance with a different LTE standard to a second of the groups of UE's 602. Accordingly, some system information may be relevant to one group and not the other. Accordingly, as illustrated by two arrows 602, 606, the first group may receive system information in a SIBm+1 604 which may not be relevant to the second group of UEs 602. The second group of the UEs may receive system information in a system information block SIBn+2 transmitted to the second group of UEs as represented by the arrow 606 which may not be relevant to the first group of UE's 601.

Single Cell Point to Multipoint (SC-PTM) Transmission

Example embodiments of the present technique will be illustrated with reference to a network controlled function which provides a transmission service defined in LTE standards which is known as single cell point to multipoint (SC-PTM) transmission. Single Cell Point to Multipoint (SC-PTM) transmission is a multicast transmission at the cell level where user data is broadcasted to multiple UEs in the cell. This network controlled function is useful to transmit data that is common to groups of UEs such as software downloads. Different data services can be multicast to different groups of UEs, for example one group of UEs may be performing software updates and another group can be receiving video broadcasts. In current LTE standards, SC-PTM utilises two types of logical channels, namely the SC-MCCH (Single Cell Multicast Control Channel) and the SC-MTCH (Single Cell Multicast Traffic Channel). The SC-MCCH provides information on the data services available and where each data service is carried by a SC-MTCH. SC-MCCH and SC-MTCH messages are carried by the PDSCH, which is scheduled by PDCCH.

Figure 7:
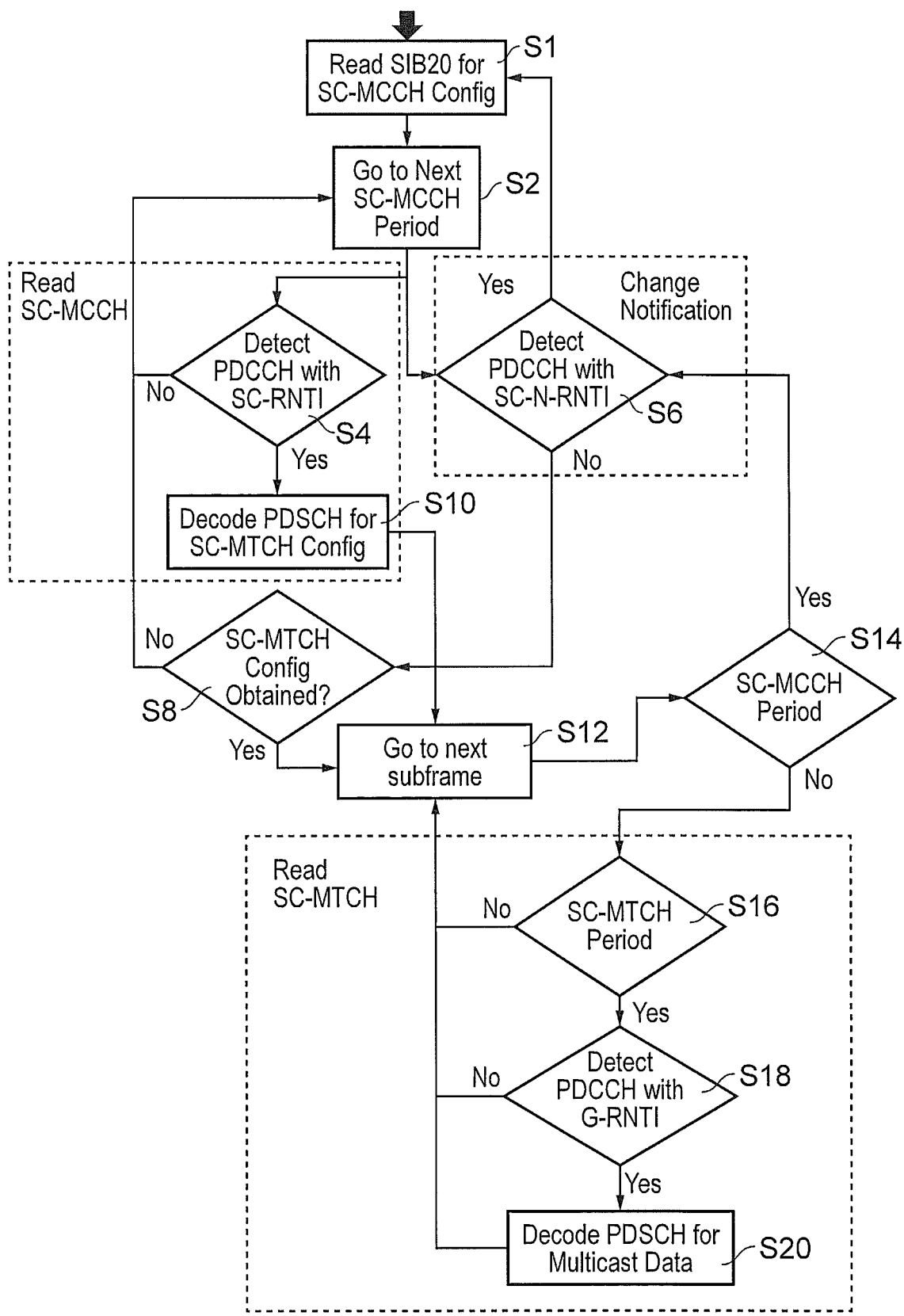
FIG. 7 is a flow diagram representing a process followed by a communications device (UE) when performing a single cell-point to multipoint communications service (SC-PTM)

An example of SC-PTM transmission procedures is shown in the flow diagram of FIG. 7. As shown in FIG. 7, a first step S1 the UE detects system information relating to the SC-PTM service by receiving SIB 20. The SIB 20 provides configuration information relating to a configuration of the SC-MCCH, for example periodicity and modification period in respect of how often the SC-MCCH can be changed.

In step S2 the UE waits for the next SC-MCCH period to detect either an SC-RNTI or and SC-N-RNTI. That is, the UE blind decodes the PDCCH using SC-RNTI during the SC-MCCH period for a possible SC-MCCH message. As shown in steps S4 and S6 respectively, the UE determines whether or not it has read either the SC-RNTI or the SC-N-RNTI. The SC-N-RNTI indicates whether there has been a change in the system information associated with the SC-PTM service. At a certain point S6 therefore, the UE determines whether a change has occurred in the SC-PTM service. If a change has occurred then the UE is configured to receive the SIB 20 information which configures the SC-MCH. If no change has occurred then the UE proceeds to decision step S8.

In step 4 if the UE detects the SC-RNTI then it proceeds to step S10 to decode the PDSCH for the SC-MTCH configuration in step S10 and proceeds to step S12 in which it goes to the next sub frame. The UE then monitors the SC-MCCH period and if detected at step S14 then the UE proceeds to step S6 to again detect whether the SC-N-RNTI is present in the PDCCH. Otherwise the UE proceeds to steps S16 to determine whether the SC-MTCH period has been reached and if so in step 18 to detect the PDCCH with the G-RNTI to identify the resources of the PDSCH for receiving the multicast data service. After receiving the multicast data the UE proceeds back to the step S12 and goes to the next sub frame and correspondingly if the SC-MTCH period has not expired in step S16 or the G-RNTI is not detected in step S18 then processing proceeds back to step S12. In step S8, if the SC-MTCH configuration has not been obtained then processing proceeds back to step S2.

Accordingly, FIG. 7 provides a flow diagram in which a configuration of the SC-PTM service is provided via the SIB 20 following which a procedure is followed in which between periods of SCMCCH, an SC-RNTI or SC-N-RNTI is detected on the conventional PDCCH and if so processing proceeds to acquire the multicast data from the SC-MTCH. Accordingly within a cell, an eNodeB may transmit multicast data to a plurality of UE's or groups of UE's which have been configured to receive data in accordance with SC-PTM.

The SC-PTM is one example of a service which is configured by a SIB (SIB20). However the multicast data services are expected to change and hence the SC-MCCH containing configuration of these services and the SC-MCCH configuration itself can also change. Such a change is indicated during the SC-MCCH period via a DCI with CRC scrambled by SC-N-RNTI transmitted by the PDCCH. When the UE detects a PDCCH with SC-N-RNTI, it would re-read SIB20 to obtain new SC-MCCH configurations and then re-read SC-MCCH for new SC-MTCH configurations (or SC-MTCH configuration for the multicast data service of interest).

For low cost and low power UEs it is desirable to provide the SC-PTM service when the UE is in an idle mode. Such an arrangement finds application with 3GPP LTE standards concerning eNodeB-IoT and feMTC. In Idle mode the UE performs discontinuous reception (DRX) as explained above DRX with a DRX period equal to the UE's Paging Occasion. In order to track for any possible changes to the SC-PTM services, in addition to the Paging Occasion, the UE also needs to power up during SC-MCCH period to detect for PDCCH using SC-N-RNTI, which would consume additional UE power. Recognising that battery life is an important feature of low power UEs and that the multicast services are unlikely to change very often, compared to non-MTC multicast services, it is proposed to remove the need for SC-N-RNTI and instead use the existing system information change notification. The system information change notification is to indicate to UEs that there is a change in the SIB, where the eNodeB would transmit a paging message indicating system information modification to trigger the UEs to re-read all the SIBs.

It should be noted that reading the entire SIBs, and even receiving paging message on PDSCH, consumes a lot of UE battery power and using SI change notification due to a change in a single SIB, i.e. SIB20, for SC-PTM would not be efficient.

As explained above with reference to FIG. 6, it is expected that UEs which are configured to operate in accordance with different LTE standards such as eNB-Internet of Things (IoT) and Further Enhanced Machine Type Communications (feMTC), in for example LTE Release-14 standards will be deployed into a network that also serves UEs which are configured to operate in accordance with earlier versions of the standard (legacy UEs), for example UEs configured in accordance with Release-13 (eNB-IoT and feMTC). It will be appreciated that such legacy devices do not support SC-PTM and hence a change in the SC-PTM service leading to a cell wide paging for system information change indication would cause such legacy UEs to re-read the SIBs (or SIB1) thereby wasting battery life, especially for devices that are in coverage enhanced region that requires numerous repetitions in order to decode the SIB.

First Examples of an Improved UE Configuration

Embodiments of the present technique can provide an arrangement in which an infrastructure equipment (eNodeB) is configured to transmit at a paging occasion a control message which indicates that configuration information associated with a network controlled function performed by the UE has changed. A UE in idle mode can determine using the control message whether or not the configuration information (system information) associated with the function performed has changed. As such, any UE which does not perform that function does not identify or detect that control message and so does not receive the paging message or updated system information. As such these UEs which do not use this function do not have to detect and decode the system information, which may be transmitted in SIBs, and therefore save power. In one example, the control message may include a specific Radio Network Temporary Identifier (RNTI) which identifies to the UE that a SIB identified by the RNTI should be received to update system information associated with a function performed by the UE. Therefore not only do UEs which do not perform this function not have to detect and decode the SIB, but a UE which does perform this function only has to detect and decode the identified SIB and so the UE avoids having to re-read all the SIBs or having to read SIB1 or even the paging message in order to determine which SIB has been changed. A UE that is not interested in such a SIB would just resume its DRX.

According to some examples a paging notification is only transmitted during the UE paging occasion similar to the existing paging procedure. Alternatively the paging notification is transmitted at fixed times known to all UEs, which may also be paging occasions for at least some UEs. It will be appreciated that although an illustrated application is to receive the SIB20, which provides system information for SC-PTM, embodiments of the present technique find application with any new SIB introduced for features in different standards.

Figure 8:
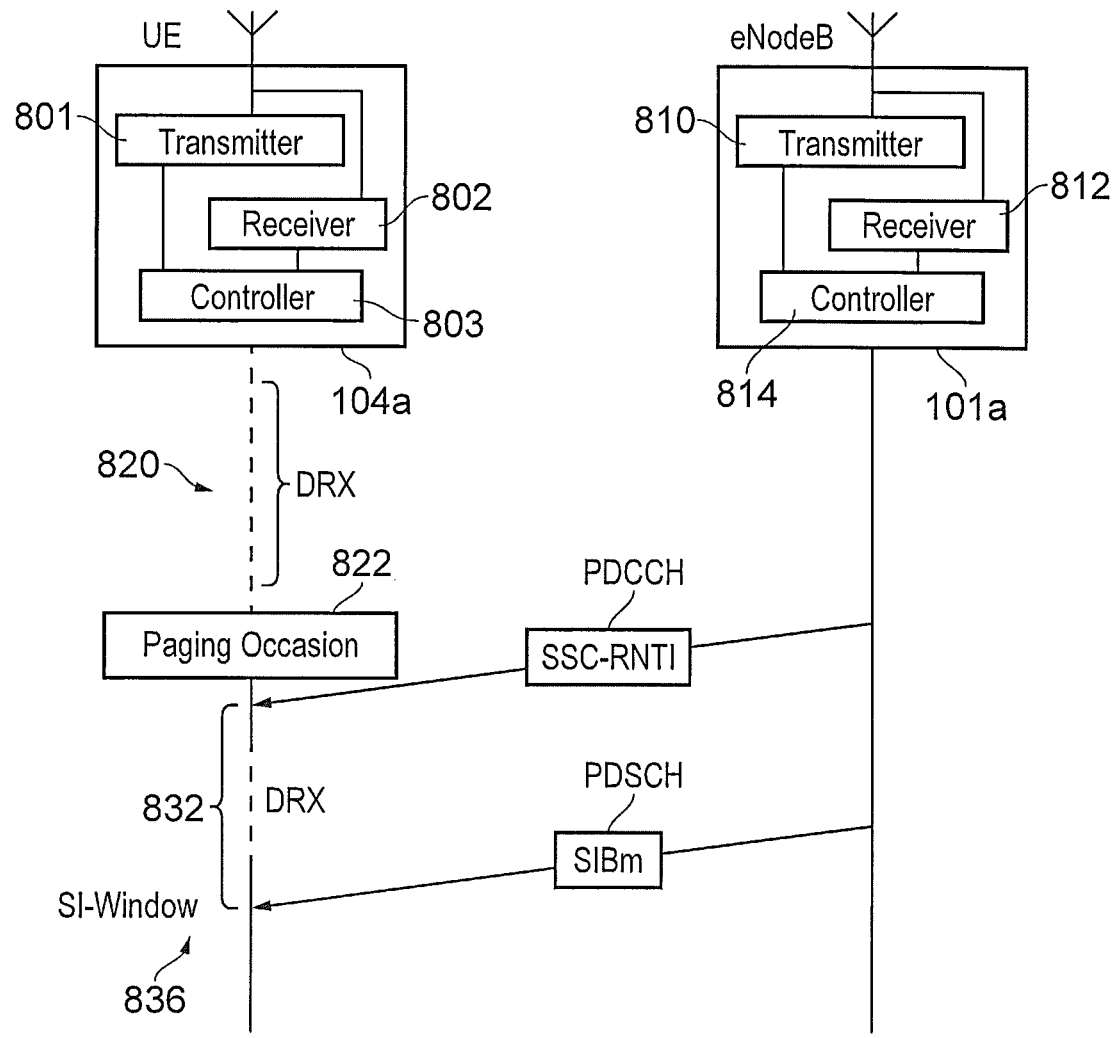
FIG. 8 is a message flow diagram part block diagram illustrating an embodiment of the present technique in which a paging indication is adapted to identify to a communications device configured to perform a network controlled function that configuration information for configuring that function has changed.

FIG. 8 provides an example illustration of embodiments of the present technique. As shown in FIG. 8 a UE 104a comprises a transmitter 801, a receiver 802 and a controller 803. Correspondingly, an eNodeB 101a comprises a transmitter 810, a receiver 812 and a controller 814. The controller 814 may be for example a scheduler which controls the transmitter and the receiver of the eNodeB 104 to transmit and receive signals in accordance with a wireless access interface such as that specified and according to an LTE standard as explained with reference to FIGS. 2 and 3. In accordance with the present technique, the eNodeB 101a is configured to transmit at a paging occasion allocated to UE's or a group of UE's a control message referred to as a paging notification. The paging notification is transmitted at the paging occasion in the PDCCH. The UE therefore detects an RNTI which is allocated to identify that corresponding system information associated with a particular function has changed. The specific RNTI has been transmitted to provide an indication as to whether or not system information relating to the particular function has changed since previously receiving the system information associated with that function. Accordingly, as shown in FIG. 8 the UE 104 may be performing a DRX cycle in order to conserve battery. However after the end of a DRX cycle represented by a period of time as a dashed line 820, a paging occasion occurs as represented by a box 822. The paging occasion therefore corresponds to a preconfigured time in which the UE 104a powers up its receiver to receive a paging message via the PDCCH from the eNodeB 101a.

The controller 803 of the UE 104a may be implemented as a microprocessor executing software or as a hardware processor or as some circuitry. The receiver and the transmitter 802, 803 may be implemented a circuits, signal processors or some radio frequency components including integrated circuits. Although the transmitter, the receiver and the controller of FIG. 8 are represented as separate elements, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). Similarly the transmitter 810, the receiver 812 and the controller may be implemented as circuits including signal processors and radio frequency components.

In accordance with the present technique the paging notification may indicate a new RNTI value which indicates to the UE that system information associated with a particular function has changed. Accordingly, at the corresponding system information window 830 which may occur after another DRX cycle 832, the UE powers up its receiver to receive in the PDSCH the SIBm from the eNodeB 101a, which is associated with a configuration of the function performed by the UE 104a.

In one example, the control message may indicate a new paging notification which identifies that a group of one or more network controlled functions may have changed and that configuration information for one or more of the functions in this group should be received to update the function(s). A paging message may then indicate which of these network controlled within the group is to be updated and for this network controlled function the corresponding configuration information (SIB) should be received. Alternatively the SIB1 can identify which of the functions out of the group should be updated and the corresponding SIB received.

In one example, the control message may indicate a new paging notification which identifies that SIBs for a certain standard or specification such as a new release of LTE standard has changed. For example, Release-13 UEs are not capable of decoding SC-PTM. Hence if the SIB20 has changed or some other Release-14 relevant SIB has changed, only the Release-14 UEs capable of decoding SIB20 will recognise the indication provided in the control message and therefore power up to receive the new SIB20. Accordingly UEs not capable for receiving the SIB20 such as a Release-13 UE will not power-up to receive the SIB20 because they will not recognise SIB20 to decode SIB20.

In an example embodiment, the paging notification may contain only a downlink control indicator (DCI) carried by the PDCCH/MPDCCH/NPDCCH, where the CRC is scrambled with a new RNTI, which is provided to indicate that for example there has been a change in a SIB. This may be referred to as a Specific SIB Change RNTI (SSC-RNTI). Only UEs that are aware of this SSC-RNTI such as low capability Release-14 UEs (for example for eNB-IoT and Rel-14 feMTC UEs) are able to decode this DCI. In an example implementation, the SSC-RNTI is equal to the SC-N-RNTI, where Release-13 NB-IoT and Rel-13 eMTC UEs that are not capable of receiving SC-PTM services would not be able to detect this new paging notification and avoid having to re-read the SIB unnecessarily as compared to using the SI change notification. Hence, a reduced power consumption is achieved for these low capability Release-13 UEs. However the Release-14 UEs (eNB-IoT and feMTC UEs) would re-read SIB20 for changes to SC-MCCH configurations.

It will be appreciated that if there are SIB changes for both UEs belonging to different groups such as UEs configured according to different version of a standard such as legacy UEs and new UEs) then the eNodeB can reuse the existing system information change notification to notify changes to both types of UE. Therefore, for example, both types of UEs will check the scheduling information for SIB changes, including SIB20, so that both SIB20 and another SIB can be updated at the same time.

According to another example, the paging notification can include an RNTI, which can be a release-specific RNTI, referred to as a Release Specific RNTI (RSC-RNTI). If there is a SIB change that affects only a particular version of a standard, such as Release-14 UEs, which indicates an SIB20 change, then the RSC-RNTI is used in the paging notification. As a result, only Release-14 UEs (and beyond), which may be configured to decode the SC-PTM service, are triggered to receive the changed SIBs. These Release-14 UEs can therefore re-read either only the Release-14 specific SIBs or the full set of SIBs. If a SIB change affects UEs of any release, the normal SI-RNTI is used.

The above description has discussed different types of UE (e.g. Release-13/Release 14; SC-PTM-capable/non-capable) monitoring different types of RNTI (SI-RNTI, SSC-RNTI, RSC-RNTI etc.) at the same paging occasion. In other embodiments, the different types of UE monitor different paging occasions. For example, Release-13 UEs would monitor the paging occasions that are defined for Release-13 UEs. Release-14 UEs would monitor either (1) both the Release-13 and Release-14 paging occasions or (2) just the Release-14 paging occasions. If there is a SIB update that affects just Release-14 UEs, the paging occasion that is only applicable to Release-14 UEs is used to transmit the paging notification.

In another example embodiment the paging notification may also include an indication of changes to the scheduling of the indicated SIB. This new scheduling of the SIB can be indicated in the DCI or in a corresponding paging message carried by the PDSCH. In the latter example, the DCI would provide a downlink grant of communications resources in the PDSCH to carry this paging message.

In another example embodiment, the changes to the SIB are included in paging notification itself. For example, when a low capability Release-14 UE (eNB-IoT or feMTC UEs) detects a DCI using a SC-N-RNTI in a paging notification, it would proceed to obtain the downlink grant from this DCI and decode the corresponding paging message carried by the scheduled PDSCH. This paging message would contain the SC-MCCH configuration information (i.e. information in SIB20).

In another embodiment, the paging notification can be used to indicate changes to a group of SIBs. For example, the paging notification can indicate which SIBs, which are related to features supported by a group of UEs has changed.

According to one example the paging notification uses a conventional system information update procedure, except that the RNTI is set such that only UEs supporting a specific feature (e.g. NB-IoT SC-PTM) will continue to SIB acquisition of a specific SIB. However, in another example specific paging occasions are configured which may include the paging notification of a SIB change. This provides an advantage that the UE will not "miss" paging occasions due to very long DRX. With long DRX, the UE may need to check SIB1 to confirm whether SIBs have changed, in case the DRX is longer than a system information modification period or MCCH modification period for the example of SC-PTM. To avoid requiring a UE to receive the SIB1 again, the fixed location of SSC-RNTI is checked by the UE.

As will be appreciated, coverage enhancement techniques can be used for a group of UEs which may differ from another group of UEs. Coverage enhancement techniques can include repeated transmission of the same information, which can be combined at a receiver to increase the likelihood of being able to detect the information. As such UEs with different coverage enhancement techniques can provide different services or different types of service. For example an SC-MCCH may be different depending on different levels of coverage enhancement. As such, in some examples, the paging notification can notify changes to SC-MCCH at different coverage levels using different SCC-RNTI indicators. As such a change to the SC-MCCH for one coverage enhancement level may be signalling by a different SCC-RNTI and so the change of the corresponding system information may be managed separately.

Second Example of an Improved Technique

According to example embodiments of the present technique a UE may be configured to receive multicast data transmitted in accordance with the SC-PTM service whilst the UE is in an idle mode. As such the eNodeB may not be aware of that the UE is currently receiving downlink multicast data. However some classes of UE such as low capability devices (MTC devices or IoT devices) may be resource restricted and so may not be able to receive the multicast data whilst also receiving downlink data according to a conventional unicast transmission when the UE is in a connected mode. This is because for example different narrowband communications may be required at one or both of baseband or radio frequency whereas the UE may have a limited communications bandwidth for receiving data. In other examples, the UE may be power limited and so may not be able to establish a connection with the eNodeB for receiving the downlink data and continue to perform other functions such as streaming video from a WiFi link. The eNodeB may need to prioritise the transmission of downlink data with respect to other functions performed by the UE.

In one example a UE in idle mode may be receiving SC-PTM, for example to receive a scheduled software update, but must still monitor for paging, for example to receive important notifications from the network. An example of an important notification may be a command to shut off the gas supply in case of emergency. Embodiments of the present technique therefore seek to introduced a prioritisation in whether to establish the connection for receiving the downlink link data as a unicast transmission, because it may be more important in some cases to complete the broadcast service reception, such as a software update, because the UE may need to wait some time until the next time the service is broadcast, and the paging may be for some a less important service such as requesting a meter reading. In other cases the unicast service should have priority, for example, an urgent report is required from the device and for a UE in idle mode, a paging message requesting a connection for receiving this report may thus have higher importance.

In some example a priority may be fixed between downlink requests from the network, such as making paging a higher priority than a multicast transmission. However in other examples other factors may be considered in order to provide flexibility to handle all cases and hence a mechanism can give the network control over different messages.

According to one example embodiment of the present technique, the UE notifies the network of an ongoing SC-PTM reception in a paging response. This particularly this may be indicated by the selection of a specific preamble sequence from a particular group of sequences, or it may be in the RRC signalling, in the RRC Connection Request or RRC Connection Setup Complete messages. The eNodeB can then decide whether to prioritise the unicast service, or to abort RRC establishment so the UE can continue to receive the broadcast service (such as a software update). The indication may alternatively be used by the network to configure the unicast service on the same carrier as the broadcast service or on a narrowband carrier, assuming the broadcast and unicast service can be configured on different resources of the same carrier. In this example, both unicast and multicast services can be received by the UE—in which case it makes sense for the UE to indicate ongoing SC-PTM services or interest in all connection establishment procedures, so that the network can configure unicast services accordingly.

Figure 9:
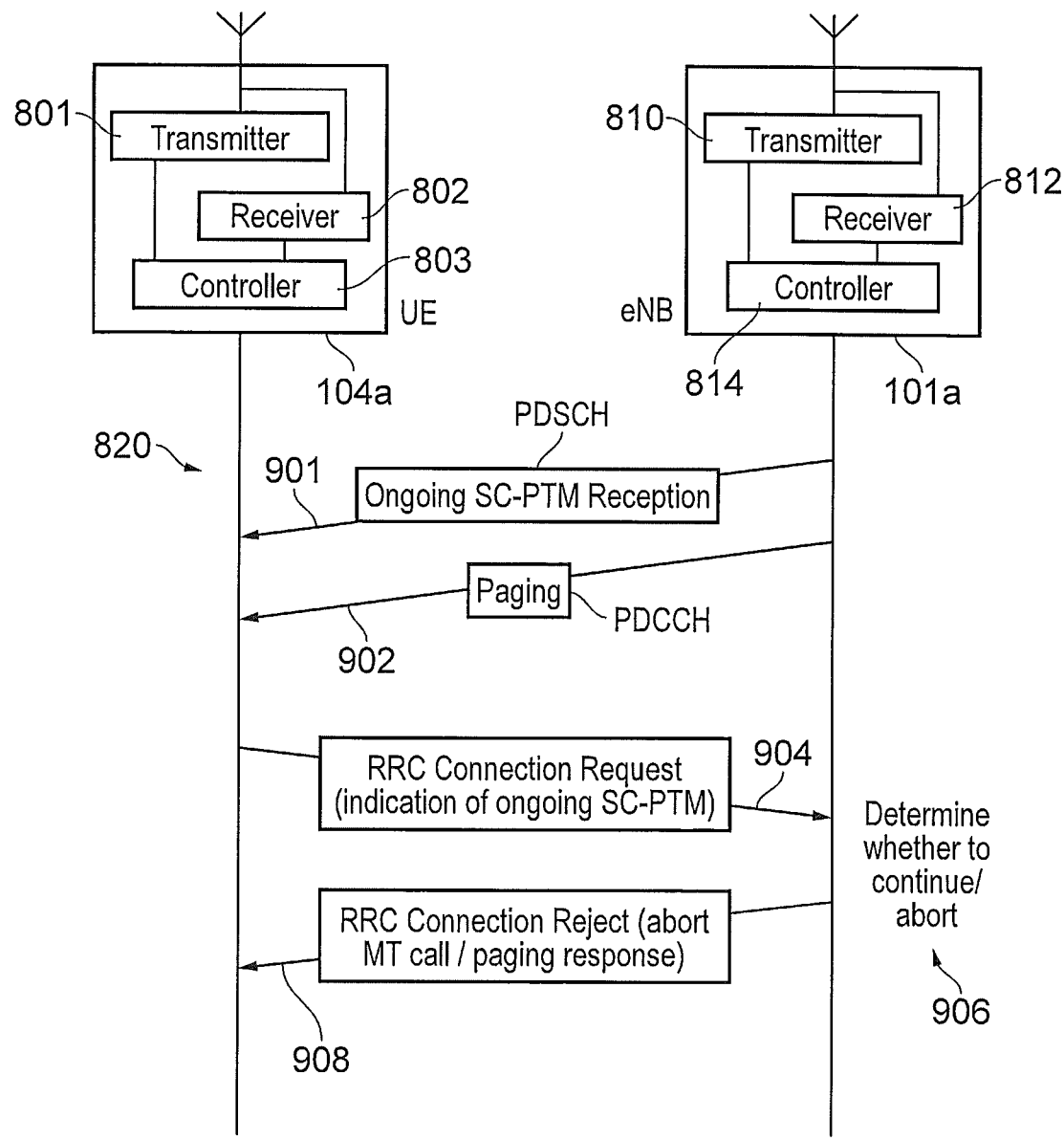
FIG. 9 is a message flow diagram and part block diagram illustrating an embodiment of a further aspect of the present technique in which a communications device provides an indication of a function being performed, which can be used to prioritise that function with respect to establishing a connection for the communications device to receive downlink data.

FIG. 9 provides a schematic illustration according to an example embodiment of the present technique. As shown in FIG. 9 a UE 104 and an eNodeB 101a are shown to operate in accordance with an example embodiment in which each comprises a transmitter and a receiver and controller as explained for the example embodiments of the first improvement shown in FIG. 8. In accordance with an example embodiment of the present technique the UE may be configured to perform a function such as receiving multicast data transmission in accordance with an SC-PTM service or performing some other processing function which consumes power. According to the example shown in FIG. 9, in the first step, the UE 104 is receiving an SC-PTM service in idle mode, with an effect that the reception of the SC-PTM services may be unknown to the eNodeB, since the procedure for starting the service may occur in idle mode. Additionally, within a tracking area, the network does not know the cell the UE is in and hence paging is sent in all cells in that tracking area, although the SC-PTM services might not be the same in all cells.

As shown in FIG. 9 as an example illustration the eNodeB 101a is configured with the controller 814 and transmitter 810 to transmit multicast data via an SC-PTM service in a PDSCH as represented by an arrow 901. Accordingly this SC-PTM transmission may be in accordance with the conventional arrangement shown in FIG. 7. However contemporaneously with the transmission of the multicast data according to the SC-PTM service, the eNodeB 101a determines that it has downlink data for transmission to the UE 104a. Accordingly the eNodeB 101a transmits a paging message in the PDCCH as shown by an arrow 902. The paging message may correspond to the P-RNTI transmitted in arrow 404 shown in FIG. 4.

According to this example, contemporaneously with the reception of the multicast data according to the SC-PTM service, the UE may receive a separate paging message indicating that the eNodeB 101a has data for transmission on the downlink as for example illustrated by the example shown in FIG. 4. However in accordance with the present technique the UE may respond by indicating that it is currently occupied with another task such as receiving multicast data by an SC-PTM service. Accordingly the eNodeB may determine that the UE should continue with the function such as receiving the multicast data via the SC-PTM service or determine that the UE should continue to establish the RRC connection to receive the downlink data in accordance with a predetermined priority.

As shown in FIG. 9, the UE 104a proceeds to perform a random access procedure as illustrated in FIG. 4 followed by an RRC connection set up. However in response to the paging message 902 the UE 104 transmits an RRC connection request with an indication of a service currently being performed by the UE such as for example reception of the SC-PTM multicast data as represented by an arrow 904. This indication can be transmitted as part of Message 3 or alternatively this can be done using preamble partitioning. Upon receipt of the indication that the UE 104 is currently receiving data via an SC-PTM service the controller 814 determines whether it should continue to transmit the downlink data by establishing the RRC connection or abort the RRC connection and continue with the multicast transmission via the SC-PTM service. This process is represented by a step 908 in FIG. 9. After the eNodeB has determined whether or not the UE should continue performing the function such as receiving the multicast transmission via SC-PTM, or abort the reception of the multicast data and continue to establish connection for receiving the downlink data, the eNodeB transmits in a message 908 an RRC connection response which is adapted to indicate that the UE 104a should either abort the RRC connection set up in favour of receiving the multicast data or stop the reception of the multicast data or other function known to the eNodeB and establish the RRC connection for receiving the downlink data.

As will be appreciated according to these example embodiments, receiving multicast data via an SC-PTM service is one example of a function performed by a UE which may be interrupted by the transmission of a downlink transmission from the eNodeB in accordance with a predetermined priority provided that the eNodeB is aware of the function being performed by the UE.

In another example, the UE indicates an ongoing SC-PTM in an RRC Connection Setup complete message. While this implies larger signalling overhead, and hence more time spent performing signalling, more information can be provided such as specific services being received. This could then be used by the network to decide how to configure a UE. For example, multicast and unicast services may be provided on the same carrier or narrowband carrier, and the eNodeB will configure the UE accordingly so that both can be received. The eNodeB can also potentially provide "missing" PTM information via unicast, so that the UE can "repair" the service using this missing information or provide the entire PTM information to the UE via unicast.

In the existing SC-PTM, the UE can transmit a Multimedia Broadcast Multicast Service (MBMS) Interest Indication in an RRC connected message. This is used by the network to determine whether to handover the UE to another frequency which provides particular MBMS services. A list of frequencies and priorities can therefore be provided to the eNodeB in order to apply priorities to the services performed by the UE.

According to some examples the UE may transmit an indication of ongoing services or services which are about to be performed on the current carrier or non-network dependent services, which may be provided on different narrowbands or NB-IOT non-anchor carriers. IF a UE cannot receive multiple narrowbands simultaneously this information is needed during RRC Connection Establishment in order to either abort a unicast service establishment or to configure unicast on the same narrowband as broadcast services.

Various further aspects and features of the present invention are defined in the following numbered paragraphs:

Paragraph 1. An infrastructure equipment for transmitting data to or receiving data from one or more communications devices in a wireless communications network, the infrastructure equipment comprising:
   transmitter circuitry configured to transmit signals to the communications devices via a wireless access interface,
   receiver circuitry configured to receive signals from the communications devices via the wireless access interface, and controller circuitry configured to control the transmitter circuitry
   to determine that a network controlled function performed by any of the communications devices which may be transmitting to or receiving signals from the infrastructure equipment are to receive updated configuration information for re-configuring the network controlled function, the configuration information being broadcast by the infrastructure equipment for the communications devices to receive, and
   to transmit a paging notification as a control message in the control channel indicating that the configuration information broadcast for the communications devices for the configuration of the network controlled function has changed, whereby the communications devices which are configured to perform the network controlled function are provided with an indication to receive the updated broadcasted configuration information associated with the function.

Paragraph 2. An infrastructure equipment according to Paragraph 1, wherein the controller circuitry is configured with the transmitter circuitry to form one or more paging occasions in which the communications devices of the group are configured to detect the paging notification when the communications devices are in an idle mode in which the communications devices only receive signals and do not transmit signals, and to transmit the paging notification in the paging occasions to the communications devices of the group.

Paragraph 3. An infrastructure equipment according to Paragraph 1 or 2, wherein the paging notification transmitted to the communications of the group includes an identification of the configuration information which is to be updated, and the controller circuitry is configured with the transmitter circuitry to transmit the updated configuration information at a predetermined time window.

Paragraph 4. An infrastructure equipment according to any of Paragraphs 1, 2 or 3, wherein the communications devices comprises a group of one or more communications devices which are configured in accordance with a specification which differs from a configuration specified for other communications devices.

Paragraph 5. An infrastructure equipment according to any of Paragraphs 1 to 4, wherein the communications devices comprise communications devices which receive signals transmitted from the infrastructure equipment in accordance with a different level of coverage enhancement from others of the communications devices.

Paragraph 6. An infrastructure equipment according to any of Paragraphs 1 to 5, wherein the network controlled function is a multicast communication function, in which data is transmitted by the transmitter circuitry for reception by any of the one or more communications devices which are configured with the multicast communication function, the paging notification providing an indication that the multicast communication function has changed and that the one or more communications devices which are configured to perform the multicast communication function should receive the configuration information broadcast by the infrastructure equipment for re-configuring the multicast communication function.

Paragraph 7. An infrastructure equipment according to Paragraph 6, wherein the multicast communication function is a 3GPP specified single cell point to multipoint transmission (SC-PTM) function.

Paragraph 8. An infrastructure equipment according to any of Paragraphs 1 to 7, wherein the paging notification transmitted in the control channel is a radio network temporary identifier, which uniquely identifies the network controlled function to be re-configured.

Paragraph 9. A communications device for transmitting data to or receiving data an infrastructure equipment in a wireless communications network, the communications device comprising transmitter circuitry configured to transmit signals to the infrastructure equipment via a wireless access interface, receiver circuitry configured to receive signals from the infrastructure equipment via the wireless access interface, the wireless access interface having a time divided structure providing communications resources arranged in repeated time divided units of a carrier frequency bandwidth, and including on the downlink in the time divided units a control channel for transmitting control channel messages and a shared channel providing communications resources for allocation to the communications device to receive data on the downlink, and controller circuitry configured to control the receiver circuitry to monitor the control channel for a paging notification transmitted as a control message, and if the paging notification indicates that a network controlled function which the communications device is configured to perform has changed, the receiver circuitry is configured to receive updated configuration information which is broadcast by the infrastructure equipment for any communications devices configured to perform the network controlled function to receive, and the controller circuitry is configured to re-configure the transmitter circuitry and the receiver circuitry in accordance with the received updated configuration information to perform the network controlled function.

Paragraph 10. A communications device according to Paragraph 9, wherein the controller circuitry is configured to control the receiver circuitry to monitor with respect to a temporal reference, one or more paging occasions in which the paging notification may be transmitted by the infrastructure equipment to detect the paging notification when transmitted, each paging occasion being determined with respect to a number of the time divided units of the wireless access interface.

Paragraph 11. A communications device according to Paragraph 9 or 10, wherein the controller circuitry is configured to control the receiver circuitry to monitor the control channel for the paging message when in a mode in which the receiver circuitry is configured to receive signals and the transmitter circuitry does not transmit signals to the infrastructure equipment.

Paragraph 12. A communications device according to Paragraph 9, 10 or 11, wherein the paging notification includes an identification of the configuration information which is to be updated, and the controller circuitry is configured with the receiver circuitry to receive the updated configuration information at a predetermined time window.

Paragraph 13. A communications device according to any of Paragraphs 9 to 12, wherein the communications device is one of a group of one or more communications devices which are configured in accordance with a specification which differs from a configuration specified for other communications devices.

Paragraph 14. A communications device according to any of Paragraphs 9 to 13, wherein the receiver circuitry is configured to receive signals transmitted from the infrastructure equipment in accordance with a different level of coverage enhancement from other communications devices.

Paragraph 15. A communications device according to any of Paragraphs 9 to 14, wherein the network controlled function is a multicast communication function, in which data is transmitted by the infrastructure equipment to any communications device which are configured with the multicast communication function and received by the receiver circuitry, the paging notification providing an indication that the multicast communication function has changed and that the communications device which is configured to perform the multicast communication function should receive the configuration information broadcast by the infrastructure equipment for re-configuring the multicast communication function.

Paragraph 16. A communications device according to Paragraph 15, wherein the multicast communication function is a 3GPP specified single cell point to multipoint transmission (SC-PTM) function.

Paragraph 17. An infrastructure equipment according to any of Paragraphs 9 to 16, wherein the paging notification received in the control channel is a radio network temporary identifier, which uniquely identifies the network controlled function to be re-configured.

Paragraph 18. A method of transmitting data from an infrastructure equipment of a wireless communications network to one or more communications devices or receiving data from the one or more communications devices at the infrastructure equipment, the method comprising determining that a network controlled function performed by any of the communications devices which may be transmitting signals to or receiving signals from the infrastructure equipment are to receive updated configuration information for re-configuring the network controlled function to perform either transmitting data to or receiving data from an infrastructure equipment, the configuration information being broadcast by the infrastructure equipment for the communications devices to receive, and transmitting a paging notification as a control message in the control channel indicating that the configuration information broadcast for the communications devices for the configuration of the network controlled function has changed, whereby the communications devices which are configured to perform the network controlled function are provided with an indication to receive the updated broadcasted configuration information associated with the function.

Paragraph 19. A method of transmitting data from a communications device to an infrastructure equipment in a wireless communications network or receiving data from an infrastructure equipment, the method comprising monitoring the control channel for a paging notification transmitted as a control message, and if the paging notification indicates that a network controlled function which the communications device is configured to perform has changed including one or both of transmitting or receiving data, receiving updated configuration information which is broadcast by the infrastructure equipment for any communications devices configured to perform the network controlled function to receive, and re-configuring the commutations device in accordance with the received updated configuration information to perform the network controlled function.

Paragraph 20. An infrastructure equipment for transmitting data to or receiving data from one or more communications devices in a wireless communications network, the infrastructure equipment comprising:

transmitter circuitry configured to transmit signals to the communications devices via a wireless access interface, receiver circuitry configured to receive signals from the communications devices via the wireless access interface, and controller circuitry is configured to control the transmitter circuitry and the receiver circuitry to transmit a paging message to one of the communications devices currently in a mode in which signals are only being received by the communications device from the infrastructure equipment, the paging message indicating that the communications device should establish a connection with the infrastructure equipment to receive downlink data transmitted from the infrastructure, to receive, as part of a procedure for establishing the connection for transmitting the downlink data, an indication from the communications device of a function being performed or about to be performed by the communications device, to determine, in accordance with a predetermined condition, whether the communications device should continue to establish the connection for receiving the downlink data from the communications device, and in accordance with the predetermined condition to transmit an indication to the communications device either to abandon the connection for transmitting the data to the communications device or to establish the connection and to transmit the downlink data.

Paragraph 21. An infrastructure equipment according to Paragraph 20, wherein the function being performed or about to be performed by the communications device includes a multicast communication function, in which multicast data is transmitted by the transmitter circuitry for reception by any communications devices which is configured with the multicast communication function, the communications device having been configured to receive the unicast data.

Paragraph 22. An infrastructure equipment according to Paragraph 21, wherein the predetermined condition includes whether the communications device has a receiver capable of receiving the downlink data and the multicast data contemporaneously, and if the communications device is capable of receiving the downlink data and the multicast data contemporaneously to transmit an indication to establish the connection for transmitting the downlink data.

Paragraph 23. An infrastructure equipment according to Paragraph 22, wherein the predetermined condition includes determining whether the downlink data and the multicast data can be received by the communications device on the same carrier or narrowband carrier.

Paragraph 24. An infrastructure equipment according to Paragraph 22 or 23, wherein the controller circuitry is configured to transmit an indication that the communications device should establish the connection for receiving the downlink data and the multicast data to be on the same carrier or narrowband carrier if the predetermined condition indicates that the communication device can receive the downlink data and the multicast data on the same carrier or narrowband carrier.

Paragraph 25. An infrastructure equipment according to Paragraph 20, wherein the indication of the function being performed or about to be performed by the communications device is a function which consumes processing power, communications bandwidth or consumes electrical power and a combination of the function being performed or about to be performed and receiving the downlink data is likely to exceed a limit of at least one of a processing power, a communications bandwidth or an electrical power available to the communications device.

Paragraph 26. An infrastructure equipment according to Paragraph 25, wherein the indication of the function being performed or about to be performed by the communications device is a function which consumes a communications bandwidth for receiving data or a number of narrowband carriers on which the receiver circuitry can receive the downlink data.

Paragraph 27. An infrastructure equipment according to Paragraph 25, wherein the indication of the function being performed or about to be performed by the communications device is a function which consumes a processing power which is limited, the processing power required to receive data being likely to exceed the limited processing power.

Paragraph 28. An infrastructure equipment according to Paragraph 25, wherein the indication of the function being performed or about to be performed by the communications device is a function which consumes electrical power, the reception of the downlink data being likely to cause a drain on the electrical power which will exceed the limit in the electrical power.

Paragraph 29. An infrastructure equipment according to any of Paragraphs 20 to 28, wherein the controller circuitry is configured with the transmitter circuitry and the receiver circuitry to transmit multicast data to the communications device whilst the communications device is in the mode which is an idle mode, wherein the indication of the function performed or about to be performed by the communications device is receiving the multicast data, and the predetermined condition determines whether the communications device should continue to receive the multicast data or to receive the downlink data from the infrastructure equipment.

Paragraph 30. A communications device for transmitting data to or receiving data an infrastructure equipment in a wireless communications network, the communications device comprising
- transmitter circuitry configured to transmit signals to the infrastructure equipment via a wireless access interface,
- receiver circuitry configured to receive signals from the infrastructure equipment via the wireless access interface, and controller circuitry configured to control the receiver circuitry
- to receive a paging message when the communications device is in an idle mode in which signals are only being received by the communications device from the infrastructure equipment, the paging message indicating that the communications device should establish a connection with the infrastructure equipment to receive downlink data transmitted from the infrastructure,
- to transmit, as part of a procedure for establishing the connection for receiving the downlink data from the infrastructure equipment, an indication of a function being performed or about to be performed by the communications device, and
- to receive an indication from the infrastructure equipment that the communications device should either not establish the connection for receiving the data from the infrastructure equipment or establish the connection and to receive the downlink data from the infrastructure equipment.

Paragraph 31. A communications device according to Paragraph 30, wherein the function being performed or about to be performed by the communications device includes a multicast communication function, in which the receiver circuitry is configured to receive multicast data transmitted from the infrastructure equipment.

Paragraph 32. A communications device according to Paragraph 31, wherein the indication received from the infrastructure equipment is to establish the connection for receiving the downlink data, the receiver circuitry being configured to receive the downlink data and the multicast data contemporaneously.

Paragraph 33. A communications device according to Paragraph 31, wherein the receiver circuitry is configured to receive an indication that the communications device should establish the connection for receiving the downlink data and he multicast data to be on the same carrier or narrowband carrier.

Paragraph 34. A communications device according to Paragraph 30, wherein the indication of the function being performed or about to be performed by the communications device is a function which consumes processing power, communications bandwidth or consumes electrical power and a combination of the function being performed or about to be performed and receiving the downlink data is likely to exceed a limit of at least one of a processing power, a communications bandwidth or an electrical power available to the communications device.

Paragraph 35. A communications device according to Paragraph 34, wherein the indication of the function being performed or about to be performed by the communications device is a function which consumes a communications bandwidth for receiving data or a number of narrowband carriers on which the receiver circuitry can receive the downlink data.

Paragraph 36. A communications device according to Paragraph 34, wherein the indication of the function being performed or about to be performed by the communications device is a function which consumes a processing power which is limited, the processing power required to receive data being likely to exceed the limited processing power.

Paragraph 37. A communications device according to Paragraph 34, wherein the indication of the function being performed or about to be performed by the communications device is a function which consumes electrical power, the reception of the downlink data being likely to cause a drain on the electrical power which will exceed the limit in the electrical power.

Paragraph 38. A communications device according to in any of Paragraphs 31 to 37, wherein the controller circuitry is configured with the receiver circuitry to receive the multicast data whilst the communications device is in the mode which is an idle mode.

Paragraph 39. A method of transmitting data to or receiving data from one or more communications devices in a wireless communications network, the method comprising
- transmitting a paging message to one of the communications devices currently in a mode in which signals are only being received by the communications device from the infrastructure equipment, the paging message indicating that the communications device should establish a connection with the infrastructure equipment to receive downlink data transmitted from the infrastructure,
- receiving, as part of a procedure for establishing the connection for transmitting the downlink data, an indication from the communications device of a function being performed or about to be performed by the communications device,
- determining, in accordance with a predetermined condition, whether the communications device should continue to establish the connection for receiving the downlink data from the communications device, and
- in accordance with the predetermined condition, transmitting an indication to the communications device either to abandon the connection for transmitting the data to the communications device or to establish the connection and to transmit the downlink data.

Paragraph 40. A method of transmitting data to or receiving data from an infrastructure equipment in a wireless communications network, the method comprising
- receiving a paging message when the communications device is in an idle mode in which signals are only being received by the communications device from the infrastructure equipment, the paging message indicating that the communications device should establish a connection with the infrastructure equipment to receive downlink data transmitted from the infrastructure, transmitting, as part of a procedure for establishing the connection for receiving the downlink data from the infrastructure equipment, an indication of a function being performed or about to be performed by the communications device, and receiving an indication from the infrastructure equipment that the communications device should either not establish the connection for receiving the data from the infrastructure equipment or establish the connection and to receive the downlink data from the infrastructure equipment.

REFERENCES

[1] LTE for UMTS: OFDMA and SC-FDMA Based Radio Access, Harris Holma and Antti Toskala, Wiley 2009, ISBN 978-0-470-99401-6.
[2] http://lteinwireless.blogspot.co.uk/2012/12/paging-in-lte.html
[3] RP-161324, "New work item proposal: Enhancements of NB-IoT," Vodafone, Huawei, HiSilicon, Ericsson, Qualcomm, RAN#72
[4] RP-161321, "New WI proposal on Further Enhanced MTC", Ericsson, RAN#72
[5] RP-161324, "New work item proposal: Enhancements of NB-IoT," Vodafone, Huawei, HiSilicon, Ericsson, Qualcomm, RAN#72
[6] RP-161321, "New WI proposal on Further Enhanced MTC", Ericsson, RAN#72
[7] R1-166660 "Higher data rate for feMTC," Sony, RAN1#86
[8] R1-167352, "Views on techniques to improve the data rate for Rel-14 MTC," NTT DOCOMO, RAN1#86
[9] R1-081373, "Explicit DTX Signaling with ACK/NAK Bundling in TDD," Texas Instruments, Huawei, RAN1#52bis Annex 1:

As shown in FIG. 4, each LTE uplink sub-frame may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink sub-frames may also include reference signals. For example, demodulation reference signals (DMRS) 307 and sounding reference signals (SRS) 308 may be present in an uplink sub-frame where the DMRS occupy the fourth symbol of a slot in which PUSCH is transmitted and are used for decoding of PUCCH and PUSCH data, and where SRS are used for uplink channel estimation at the eNodeB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 309 and lower 310 subcarriers/frequencies/resource blocks of an uplink sub-frame are reserved for control signaling rather than the initial symbols of a downlink sub-frame. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made contiguous frequency allocations for each UE are preferable.

The invention claimed is:

1. A method of transmitting data from an infrastructure equipment of a wireless communications network to one or more communications devices or receiving data from the one or more communications devices at the infrastructure equipment, the method comprising:

transmitting a paging notification as a control message in a control channel indicating that the configuration information broadcast for the communications devices for the configuration of a network controlled function has changed, wherein the paging notification is a Specific SIB Change RNTI (SSC-RNTI), whereby the communications devices which are configured to perform the network controlled function are provided with an indication to receive updated broadcasted configuration information associated with the function.

2. The method of claim 1, further comprising:
detecting, at the communications devices of the group forming one or more paging occasions paging notification when the communications devices are in an idle mode in which the communications devices only receive signals and do not transmit signals, and
transmitting the paging notification in the paging occasions to the communications devices of the group.

3. The method of claim 1, wherein a paging notification transmitted to the communications of the group includes an identification of the configuration information which is to be updated, the method further comprising:
transmitting the updated configuration information at a predetermined time window.

4. The method of claim 1, wherein the communications devices comprise a group of one or more communications devices which are configured in accordance with a specification which differs from a configuration specified for other communications devices.

5. The method of claim 1, wherein the communications devices comprise communications devices which receive signals transmitted from the infrastructure equipment in accordance with a different level of coverage enhancement from others of the communications devices.

6. The method of claim 1, wherein the network controlled function is a multicast communication function, in which data is transmitted for reception by any of the one or more communications devices which are configured with the multicast communication function, a paging notification providing an indication that the multicast communication function has changed and that the one or more communications devices receive the configuration information broadcast by the infrastructure equipment for re-configuring the multicast communication function.

7. The method of claim 6, wherein the multicast communication function is a 3GPP specified single cell point to multipoint transmission (SC-PTM) function.

8. The method of claim 1, wherein a paging notification transmitted in a control channel is a radio network temporary identifier, which uniquely, identifies the network controlled function to he re-configured.

9. A method of transmitting data from a communications device to an infrastructure equipment in a wireless communications network or receiving data from an infrastructure equipment, the method comprising:
monitoring the control channel for a paging notification transmitted as a control message, and
in response to the paging notification, wherein the paging notification is a Specific SIB Change RNTI (SSC-RNTI), indicating that a network controlled function has changed,
re-configuring the communications device in accordance with received updated configuration information to perform the network controlled function.

10. The method of claim 9, further comprising:
monitoring with respect to a temporal reference, one or more paging occasions in which the paging notification may be transmitted by the infrastructure equipment to detect the paging notification when transmitted, each paging occasion being determined with respect to a number of the time divided units of the wireless access interface.

11. The method of claim 9, further comprising:
monitoring the control channel for the paging message in response to being in a mode in which the communications device receives signals and does not transmit signals to the infrastructure equipment.

12. The method of claim 9, wherein the paging notification includes an identification of the configuration information which is to be updated, the method further comprising:
receiving the updated configuration information at a predetermined time window.

13. The method of claim 9, wherein the communications device is one of a group of one or more communications devices which are configured in accordance with a specification which differs from a configuration specified for other communications devices.

14. The method of claim 9, further comprising:
receiving signals transmitted from the infrastructure equipment in accordance with a different level of coverage enhancement from other communications devices.

15. The method of claim 9, wherein the network controlled function is a multicast communication function in which data is transmitted by the infrastructure equipment to any communications device configured with the multicast communication function, the paging notification providing an indication that the multicast communication function has changed and that the communications device receive the configuration information broadcast by the infrastructure equipment for re-configuring the multi cast communication function.

16. The method of claim 15, wherein the multicast communication function is a 3GPP specified single cell point to multipoint transmission (SC-PTM) function.

17. A method of transmitting data to or receiving data from one or more communications devices in a wireless communications network, the method comprising:
transmitting a paging message to one of the communications devices currently in an idle mode, the paging message indicating that the communications device establish a connection with an infrastructure equipment to receive downlink data transmitted from the infrastructure equipment,
receiving, as part of a procedure for establishing the connection for transmitting the downlink data, an indication from the communications device of a function being performed or about to be performed by the communications device,
determining, in accordance with a predetermined condition, whether the communications device should continue to establish the connection for receiving the downlink data from the communications device, and
in accordance with the predetermined condition, transmitting an indication to the communications device either to abandon the connection for transmitting the data to the communications device or to establish the connection and to transmit the downlink data.

18. The method of claim 17, wherein the function being performed or about to be performed by the communications device includes a multi cast communication function in which multicast data is transmitted for reception by any communications devices which is configured with the multicast communication function, the communications device having been configured to receive the unicast data.

19. The method of claim 18, wherein the predetermined condition includes whether the communications device has a receiver capable of receiving the downlink data and the multicast data contemporaneously, the method further comprising:

in response to the communications device being capable of receiving the downlink data and the multicast data contemporaneously, transmitting an indication to establish the connection for transmitting the downlink data.

20. The method of claim 19, wherein the predetermined condition includes determining whether the downlink data and the multicast data can be received by the communications device on the same carrier or narrowband carrier.

* * * * *